United States Patent [19]
Gibbs et al.

[11] Patent Number: 5,179,322
[45] Date of Patent: Jan. 12, 1993

[54] LINEARITY CORRECTION APPARATUS

[75] Inventors: Terence K. Gibbs, Stubbington; Graham Luck, Chichester, both of England

[73] Assignee: International Business Machines Corporation, Armonk, N.Y.

[21] Appl. No.: 783,485

[22] Filed: Oct. 28, 1991

[30] Foreign Application Priority Data

Nov. 27, 1990 [EP] European Pat. Off. ........ 90312871.8

[51] Int. Cl.$^5$ .......................... G09G 1/04; H01J 29/56
[52] U.S. Cl. ....................................... 315/370; 315/400
[58] Field of Search ................ 315/370, 371, 400, 408

[56] References Cited

U.S. PATENT DOCUMENTS 4,283,663  8/1981  Miyoshi et al. .
4,677,350  6/1987  Wharton et al. .
4,871,951  10/1989  Teuling et al. .

FOREIGN PATENT DOCUMENTS

62-189298  2/1989  Japan .

Primary Examiner—Gregory C. Issing
Attorney, Agent, or Firm—David Aker

[57] ABSTRACT

Linearity correction apparatus for a raster scanned cathode ray tube display device is presented. The apparatus comprises first means (16) for generating a correction signal to correct an asymmetric non linearity in a sawtooth electron beam line deflection current. The line deflection current is generated by a line timebase circuit for energising electromagnetic electron beam deflection coils of the cathode ray tube. The apparatus further comprises second means (70,90,91) cooperative with the first means (16) and responsive to a change in line timebase frequency for compensating a variation in the correction signal generated by the first means (16) in response to said change in line timebase frequency.

25 Claims, 6 Drawing Sheets

LINEARITY CORRECTION APPARATUS

The present invention generally relates to linearity correction apparatus for a raster-scanned CRT display such as a television receiver or a computer visual display unit.

A raster-scanned CRT display comprises a line timebase circuit for generating a sawtooth deflection current in a pair of electromagnetic line scan coils. The deflection current energizes the coils to produce a time variant magnetic deflection field. The deflection field scans one or more electron beams along a line from one side of the CRT screen to the other side during a line scan period and rapidly returns the electron beam during a retrace or flyback period to the start of the next line of the raster to be scanned.

The line timebase circuit typically comprises an inductor connected in series with a high voltage solid state switch such as a bipolar transistor. During the line scan period, the switch is closed and current flows through the inductor and switch from a high voltage DC supply (typically 100V) to ground. The current flowing through the inductor and the current flowing in the scan coils increase at a rate proportional to the voltage across the inductor. During the flyback period, the switch is opened. The current in the inductor rapidly reverses and a back Electromotive Force (EMF) or "flyback pulse" is generated across the inductor by the collapsing magnetic field in the inductor. The flyback pulse is controlled by a tuning capacitor connected across the switch. The back EMF dissipates causing the current in the scan coils to rapidly reverse. The electron beam is thus deflected rapidly back to the start of the next scan line.

Ideally, the deflection coils would be pure inductances. In practise however, the coils have a DC resistance. The resistance causes an assymetric non-linearity in the sawtooth deflection current. The non-linearity gives rise to objectionable asymmetric distortion of an image displayed on the CRT screen. The asymmetric distortion is a function of the inductance to resistance ratio of the deflection coils and therefore varies proportionally with frequency.

In a typical CRT display, the asymmetric non-linearity is corrected by connecting a non-linear inductor in series with the deflection coils. The non-linear inductor typically comprises a permanent magnet positioned adjacent to an inductive winding. The inductance of the non-linear inductor varies about an operating point as a function of the current flowing through the winding. Some non-linear inductors comprise a moveable magnet which can be set in position during a manufacturing process step. The moveable magnet permits manual adjustment of the polarity of the magnet relative to the winding, and therefore changes the operating point of the inductor. The moveable magnet therefore enables the asymmetric non linearity to be reduced at a particular line timebase frequency.

Recently, there have been introduced CRT displays which are operable within a range of line timebase frequencies (typically 15kHz to 64kHz). In a conventional example of such a display, a non-linear inductor is tuned to provide optimum linearity correction at a frequency towards the centre of the range. However, this has the disadvantage that images generated by the display at line timebase frequencies at the extremes of the range exhibit asymmetric non linearity distortions. In an alternative example, a set of non-linear inductors is provided. Each inductor is tuned to provide optimum linearity correction at a different frequency. A switch circuit selects a different non-linear inductor in response to a change in line deflection frequency. This has the disadvantage that the additional components of the switching circuit increase deflection circuit complexity and cost.

An aim of the present invention is therefore to provide assymetric linearity correction apparatus for a CRT display operable within a range of line timebase frequencies.

In accordance with the present invention, there is now provided linearity correction apparatus comprising first means for generating a correction signal to correct an asymmetric non linearity in a sawtooth electron beam deflection current generated by a line timebase circuit for energising an electromagnetic deflection coil within a cathode ray tube display device, characterised in that the apparatus further comprises second means cooperative with the first means and responsive to a change in line timebase frequency for compensating a variation in the correction signal generated by the first means in response to said change in line timebase frequency.

This has the advantage of providing automatic correction of any asymmetric non-linearities in a line timebase current within a range of line timebase frequencies. The range is dependent on the maximum and minimum excursions of the correction signal.

Preferably, the first means includes a non-linear inductance comprising a core of a magnetically permeable material, a permanent magnet fastened to the core, a first coil wound onto the core, and wherein the second means comprises a second coil wound onto the core and insulated from the first coil. The first coil is connected in series with a line electron beam deflection coil of an electromagnetic electron beam deflection yoke fastened to a cathode ray tube. The second means comprises a sense circuit for varying a current flowing in the second coil in response to a variation in the line timebase frequency. The operating point of the non-linear inductance provided by the first coil can therefore be varied by varying the current flowing in the second coil. In a preferred example of the present invention, there is provided a transistor for adjusting the current flowing in the second coil in response to a change in the line timebase frequency.

A preferred embodiment of the present invention will now be described, by way of example only, with reference to the accompanying drawings in which.

Figure 1:
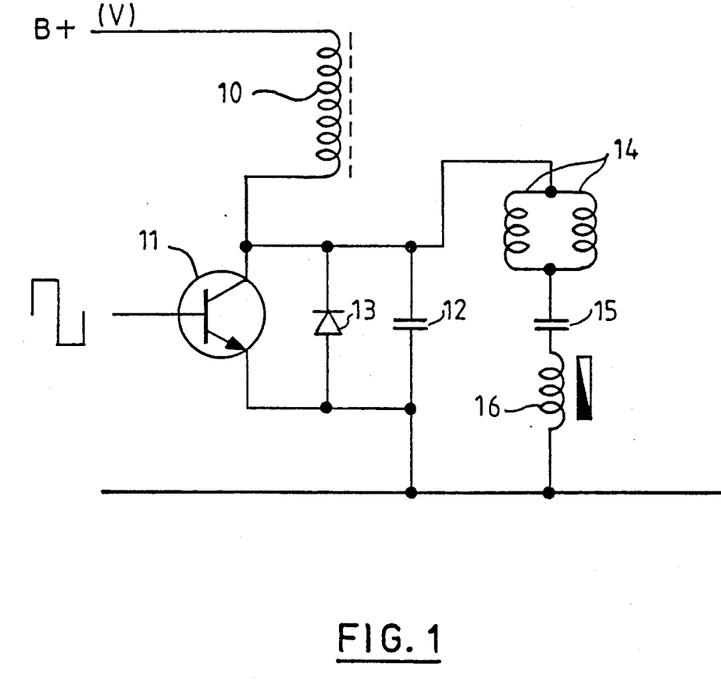
FIG. 1 is a circuit diagram of a line timebase circuit for a CRT display of the prior art.

FIG. 1 shows an example of line timebase or "flyback" circuit comprising an inductor 10 connected between a high voltage (100V) supply rail V and the collector of a bipolar transistor switch 11. The emitter of transistor 11 is connected to ground. A capacitor 12 is connected between the collector of transistor 11 and ground and a diode 13 is connected across capacitor 12 for conducting current from ground to the collector of transistor 11. A pair of line deflection coils 14 are also connected to the collector of transistor 11. The inductance of coils 14 is much smaller than that of inductor 10. An S correction capacitor 15 is connected between coils 14 and a non-linear inductor 16. Capacitor 15 compensates for a symmetrical linearity error produced by a geometrical relationship between deflection angle and electron beam displacement on a CRT screen. The capacitance of capacitor 15 is much larger than that of capacitor 12. Non-linear inductor 16 is connected between capacitor 15 and ground.

Figure 2:
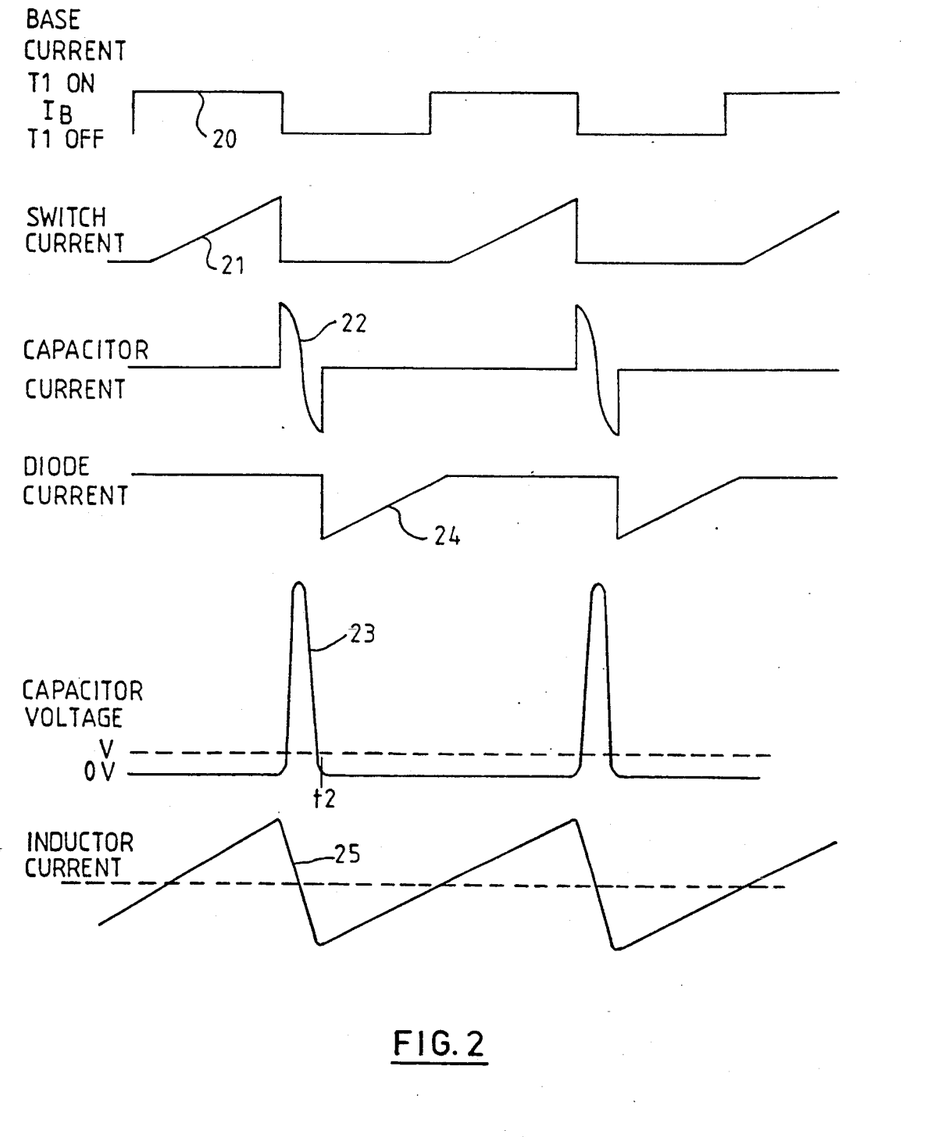
FIG. 2 is a waveform diagram corresponding to the line timebase circuit shown in FIG. 1.

Referring now to FIG. 2, in operation transistor 11 is turned on and off with a fifty per cent duty cycle by an alternating square wave base current 20. When transistor 11 is turned on, current 21 flows from the supply rail through inductor 10 to ground through transistor 11. The current increases at a rate proportional to the voltage V across inductor 10. When transistor 11 is turned off, current 22 flows through inductor 10 and into capacitor 12. Voltage 23 across capacitor 12 rises as capacitor 12 charges up thus reversing the voltage across inductor 10. The current in inductor 10 thus falls at a faster rate. Diode 13 prevents the voltage across capacitor 12 from going negative at t2 to prevent the voltage across capacitor 12 from oscillating. Current 24 now flows from ground through inductor 10 to the supply rail through diode 13 rather than out of capacitor 12. Therefore, over a full cycle, inductor 10 carries a sawtooth current 25. A current similar to sawtooth current 25 is therefore drawn through coils 14.

Coils 14 are AC coupled to ground by capacitor 15 to remove any DC offset from the current in coils 14. Furthermore, the deflection current generates a parabolic voltage across capacitor 15 which is the integral of the deflection current. The parabolic voltage in turn modulates the deflection current in coils 14 to provide cancellation of the symmetrical linearity error.

Figure 3:
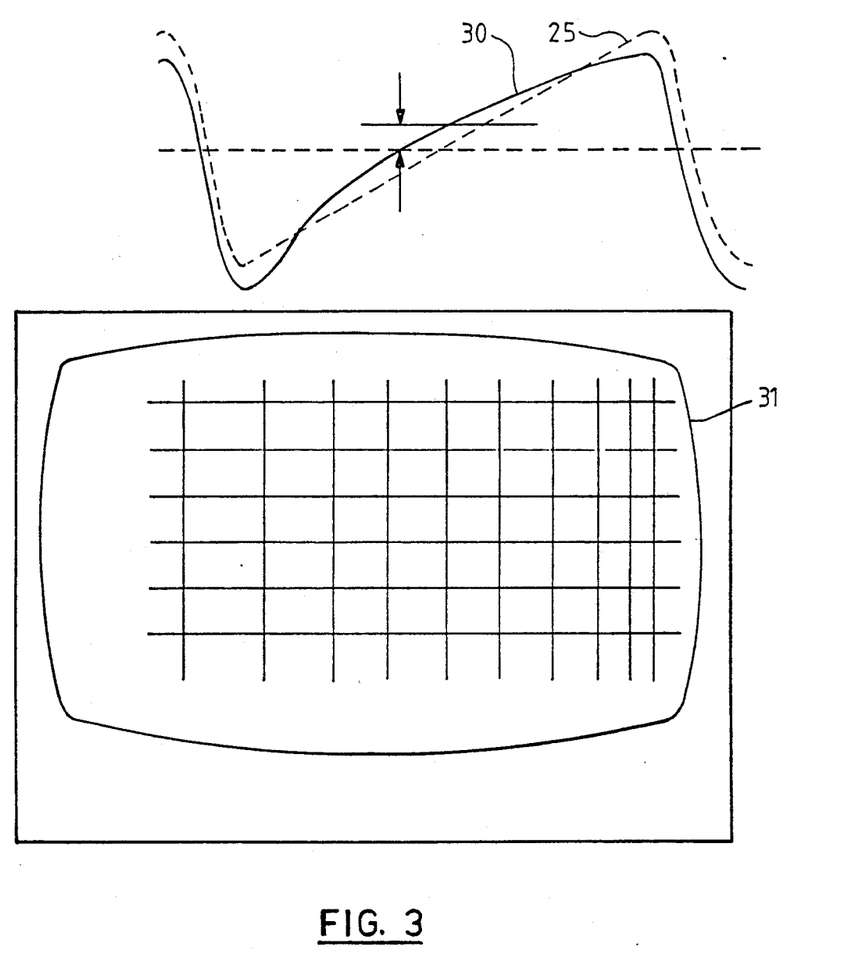
FIG. 3 is a waveform diagram illustrating a non-linear deflection current and a corresponding image geometry distortion.

Referring now to FIG. 3, the ideal deflection current with no S correction or linearity correction applied is a symmetrical, linear sawtooth current 25. However, in practise, the deflection current is an asymmetrical, non-linear sawtooth current 30. Asymmetrical non-linearities are produced in the deflection current by frequency dependent energy losses from complex parasitic impedances within the circuit. The asymmetrical deflection current 30 causes an offset, non-linear line deflection of the electron beam. This produces a distorted image illustrated by crosshatch 31.

Figure 4:
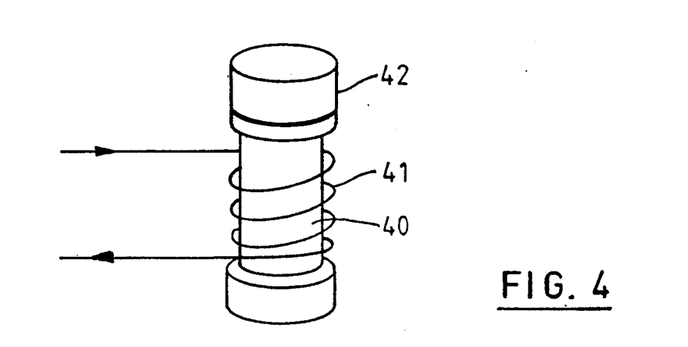
FIG. 4 is an isometric view of a non linear inductor of the prior art.
Figure 5:
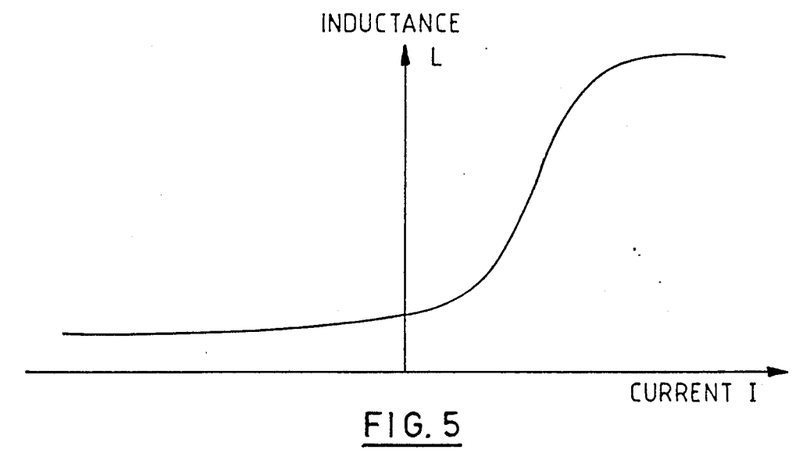
FIG. 5 is a graph illustrating the inductance of the non-linear inductor varying as a function of current flowing through the non-linear inductor.

With reference to FIG. 4, an example of non linear inductor 16 comprises dumb-bell shaped ferrite core 40 carrying an inductive coil 41. A permanent magnet 42 is bonded to the core 40. Magnet 42 causes inductance L of inductor 16 to vary as a non-linear function of current I flowing in coil 41. FIG. 5 illustrates graphically the non-linear function of inductor 16.

Figure 6:
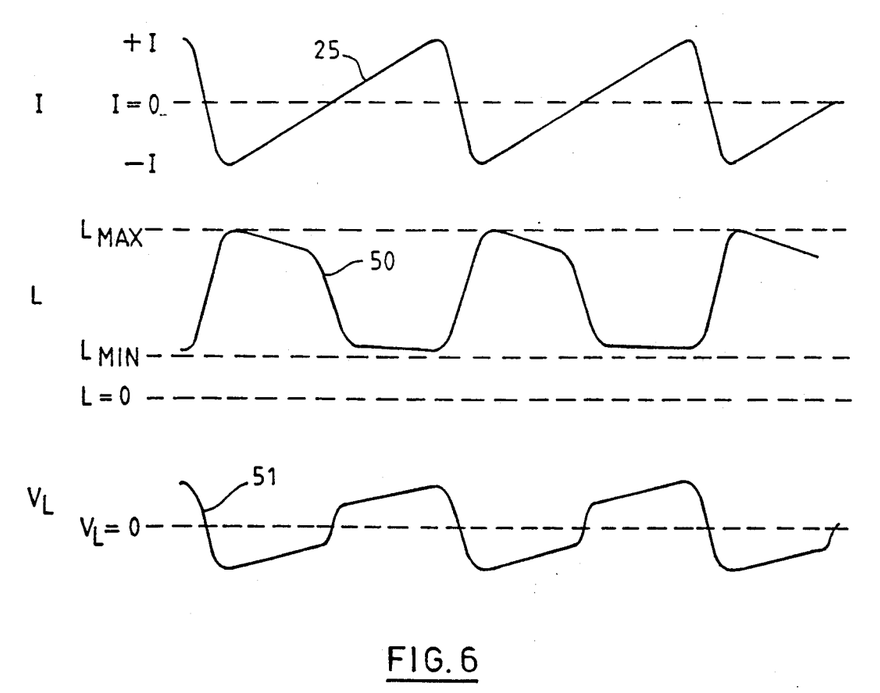
FIG. 6 is a waveform diagram illustrating the inductance of the non-linear inductor varying as a function of a sawtooth deflection current flowing through the non-linear inductor.

Referring now to FIG. 6, waveform 50 illustrates the variation of inductance L between maximum and minimum limits Lmax and Lmin in response to a sawtooth current I 25 flowing in coil 41. Thus, the impedance of inductance 16 at a particular frequency also varies between maximum and minimum values. A voltage signal 51 is therefore dropped across the inductor.

Referring back to FIG. 1, coils 14 and inductor 16 form a potential divider. In operation, the sawtooth deflection current flowing through coils 14 generates voltage signal 51 across inductor 16. Voltage signal 51 amplitude-modulates capacitor voltage 23 in such a way as to cancel the effects of the parasitic impedances on the deflection current.

Figure 7:
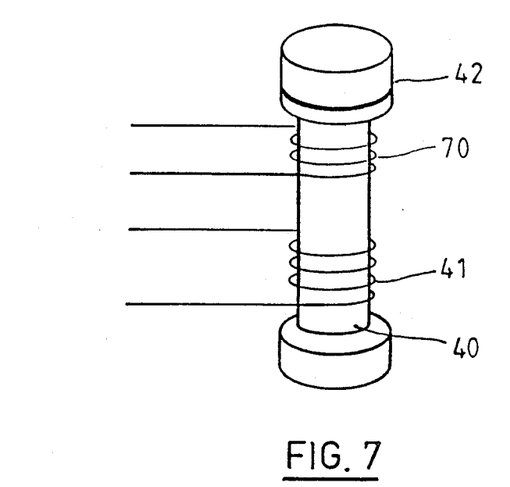
FIG. 7 is an isometric view of a non-linear inductor having variable inductance in accordance with the present invention.
Figure 8:
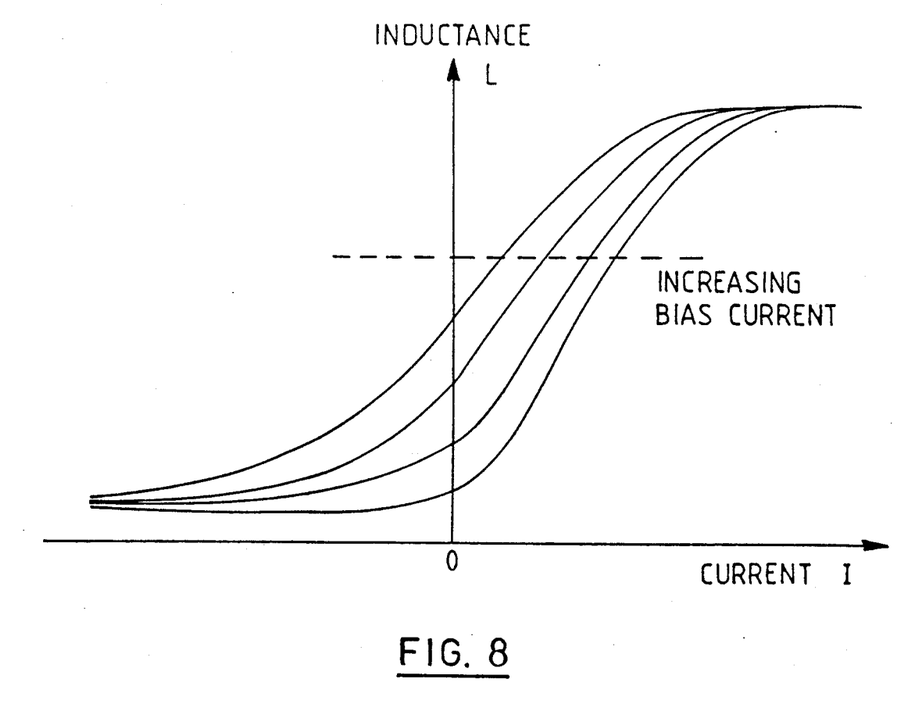
FIG. 8 is a graph illustrating the inductance of the non-linear inductor varying as a function of deflection current and a bias current applied in accordance with the present invention.

With reference to FIG. 7, in a preferred example of the present invention, non-linear inductor 16 is provided with a bias winding 70 for producing a variable biasing magnetic field in addition to the constant magnetic field provided by the permanent magnet. In operation, the biasing magnetic field is generated by passing a bias current through bias winding 70. The magnitude of the biasing magnetic field and therefore the inductance can be varied by varying the bias current. Referring now to FIG. 8, bias winding 70 permits the non linear function of inductor 16 to be modified by adjusting the bias current.

Figure 9:
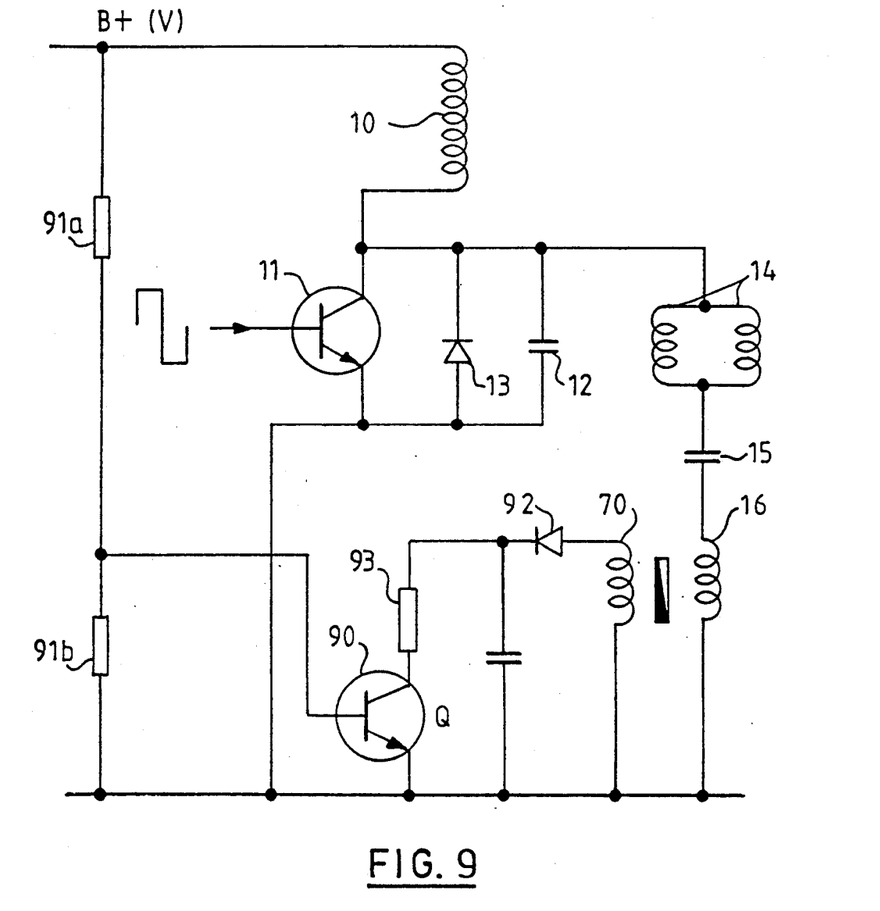
FIG. 9 is a circuit diagram of a line timebase circuit comprising linearity correction apparatus of the present invention.

FIG. 9 shows an example of a line timebase circuit including linearity correction apparatus of the present invention. The circuit is operable within a range of line timebase frequencies for providing electron beam deflection in a multiple sync or a multiple mode CRT display. In accordance with present invention, non-linearity inductor 16 comprises bias winding 70. The circuit further includes a control transistor 90 having a collector connected to bias winding 70 through a resistor 93 in series with a diode 92. The anode of diode 92 is connected to ground through bias winding 70. Transistor 90 has an emitter connected to ground and the base connected between two resistors, 91a and 91b which form a potential divider 91 between supply rail V and ground.

In operation, the deflection current flowing through inductor 16 induces by transformer action a current in bias winding 70. The current in bias winding 70 generates a biasing magnetic field which modifys the magnetic field generated by the permanent magnet and thus changes the inductance of inductor 16. The amplitude of the current flowing in bias winding 70 is regulated by transistor 90. Resistors 91a and 91b provide an appropriate base current for controlling electrical conduction between the collector and emitter of transistor 90. The base current therefore controls the current flowing through the bias winding and thus determines the operating point of inductor 16. The operating point of inductor 16 can therefore be varied in response to corresponding voltage variations on the voltage supply line.

Supply voltage rail V is variable within a range sufficient for enabling the circuit to maintain a constant sawtooth deflection current amplitude for a range of line deflection frequencies. A change in the supply generates a corresponding change in the base current supplied to transistor 90 by potential divider 91. The change in base current produces a corresponding change in collector current which, in accordance with the present invention, adjusts the operating point of inductor 16. Therefore, any asymmetric non-linearities in the sawtooth deflection current flowing through coils 14 can be eliminated automatically within the range of line timebase frequencies.

Figure 10:
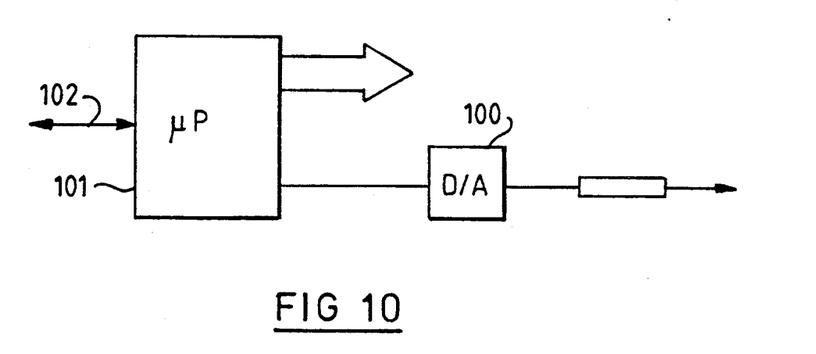
FIG. 10 is a block diagram of a control system for linearity correction apparatus of the present invention.

Referring now to FIG. 10, in another example of the present invention, the base current to transistor 90 is provided by the output of a Digital to Analogue (D to A) convertor 100. The digital input to the D to A convertor is provided by a microprocessor 101 receiving instructions from a computer bus system 102. Microprocessor 101 thus enables asymmetric linearity correction of the line deflection current to be controlled by a computer program.

An example of a line timebase circuit design embodying the present invention has now been described by way of example only. It will however be appreciated that the present invention is equally applicable in other line timebase circuit designs in which the non-linear function for correcting the assymetric non-linearity is provided by different component configurations.

We claim:

1. Linearity correction apparatus comprising first means for generating a correction signal to correct an asymmetric non linearity in a sawtooth electron beam deflection current generated by a line timebase circuit for energizing an electromagnetic deflection coil within a cathode ray tube display device, including: second means cooperative with the first means and responsive to a change in line timebase frequency for compensating a variation in the correction signal generated by the first means in response to said change in line timebase frequency; wherein the improvement comprises:
   the first means including a non-linear inductor comprising a core of a magnetically permeable material, a permanent magnet fastened to the core, a first coil wound onto the core, and wherein the second means comprises a second coil wound onto the core and insulated from the first coil, and
   regulating means for regulating current in the second coil induced by changes in current in the first coil.

2. Apparatus as claimed in claim 1 wherein the first coil is connected in series with a line timebase electron beam deflection coil of an electromagnetic electron beam deflection yoke of a cathode ray tube.

3. Apparatus as claimed in claim 2 wherein the first coil is serially connected between the line deflection coil and a voltage supply line of the line timebase circuit through an S-correction capacitor.

4. Apparatus as claimed in claim 1 wherein the regulating means comprises an input responsive to a voltage variation in a voltage supply rail in the line timebase circuit generated by a variation in the line timebase frequency.

5. Apparatus as claimed in claim 4 wherein the input to the regulating means is connected to a potential divider coupled between a pair of voltage supply rails of the line timebase circuit.

6. Apparatus as claimed in claim 1 wherein the regulating means comprises a transistor for controlling the current flowing in the second coil of the non-linear inductor and the input comprises a control electrode of said transistor.

7. Apparatus as claimed in claim 6 wherein the second coil is serially connected between a collector electrode of the transistor and a voltage supply rail of the line timebase circuit.

8. The apparatus of claim 1, in combination with said cathode ray tube display device.

9. Apparatus as claimed in claim 3 wherein the regulating means comprises an input responsive to a voltage variation in a voltage supply rail in the line timebase circuit generated by a variation in the line timebase frequency.

10. Apparatus as claimed in claim 9 wherein the regulating means is connected to a potential divider coupled between a pair of voltage supply rails of the line timebase circuit.

11. Apparatus as claimed in claim 10 wherein the input to the regulating means comprises a control electrode of a transistor for controlling the current flowing in the second coil of the non-linear inductor.

12. Apparatus as claimed in claim 11 wherein the second coil is serially connected between a collector electrode of the transistor and a voltage supply rail of the line timebase circuit.

13. Apparatus as claimed in claim 4 wherein the regulating means comprises a transistor for controlling the current flowing in the second coil of the non-linear inductor and the input comprises a control electrode of said transistor.

14. Apparatus as claimed in claim 13 wherein the second coil is serially connected between a collector electrode of the transistor and a voltage supply rail of the line timebase circuit.

15. Apparatus as claimed in claim 5 wherein the regulating means comprises a transistor for controlling the current flowing in the second coil of the non-linear inductor and the input comprises a control electrode of said transistor.

16. Apparatus as claimed in claim 15 wherein the second coil is serially connected between a collector electrode of the transistor and a voltage supply rail of the line timebase circuit.

17. A deflection circuit for energizing an electromagnetic deflection coil of a cathode ray tube display device comprising:
   sawtooth wave generating means for supplying a sawtooth current to said electromagnetic deflection coil;
   linearity correction means for generating a correction signal to correct an asymmetric non-linearity in said sawtooth current, said linearity correction means including:
   a non-linear inductor having a first coil in series with said deflection coil, and a second coil electromagnetically coupled to said first coil,
   regulating means connected across said second coil for regulating the amount of current flowing in said second coil as a result of voltage induced in said second coil by changes in current in said first coil, and
   control means for controlling said regulating means in response to a supply voltage supplied to energize said sawtooth wave generating means.

18. The circuit of claim 17 wherein said non-linear inductor further comprises a core of a magnetically permeable material and a permanent magnet fastened to said core, said first coil and said second coil being wound onto said core.

19. The circuit of claim 17 further comprising an S-correction capacitor connected in series with said deflection coil and said first coil of said non-linear inductor.

20. The circuit of claim 17 wherein said regulating means comprises a transistor having a base, a collector and an emitter, and the current induced in said second coil flows through said transistor by way of said emitter and said collector.

21. The circuit of claim 20 wherein said control means includes a voltage divider for providing a divided voltage proportional to said supply voltage, said divided voltage being supplied to the base of said transistor.

22. The circuit of claim 17 wherein said voltage supplied to energize said sawtooth wave generating means is proportional to frequency to said sawtooth current, whereby said control means controls said regulating means in response to said frequency.

23. The circuit of claim 17 wherein said control means comprises a microprocessor and a digital-to-analog converter, said microprocessor providing an input to said digital-to-analog convertor, and said digital-to-analog converter providing an output to said regulating means.

24. The circuit of claim 17, in combination with a cathode ray tube display.

25. The combination of claim 24, wherein said electromagnetic deflection coil is a horizontal deflection coil of said cathode ray tube display.

* * * * *